US008572057B2

(12) United States Patent
Jasik et al.

(10) Patent No.: US 8,572,057 B2
(45) Date of Patent: *Oct. 29, 2013

(54) METHOD AND SYSTEM FOR APPLYING A GROUP OF INSTRUCTIONS TO METADATA

(75) Inventors: Benji Jasik, San Francisco, CA (US); Simon Fell, San Francisco, CA (US); Bill Eidson, Palo Alto, CA (US); Lexi Viripaeff, Novato, CA (US)

(73) Assignee: salesforce.com, inc., San Francisco, CA (US)

( * ) Notice: Subject to any disclaimer, the term of this patent is extended or adjusted under 35 U.S.C. 154(b) by 1118 days.

This patent is subject to a terminal disclaimer.

(21) Appl. No.: 11/832,549

(22) Filed: Aug. 1, 2007

(65) Prior Publication Data

US 2008/0082504 A1   Apr. 3, 2008

Related U.S. Application Data

(60) Provisional application No. 60/827,875, filed on Oct. 2, 2006.

(51) Int. Cl.
*G06F 7/00* (2006.01)
*G06F 17/00* (2006.01)

(52) U.S. Cl.
USPC .......................................... 707/704; 707/783

(58) Field of Classification Search
USPC ............ 707/999.001, 704, 999.003, 999.009, 707/783
See application file for complete search history.

(56) References Cited

U.S. PATENT DOCUMENTS

| | | |
|---|---|---|
| 5,495,610 A | 2/1996 | Shing et al. |
| 5,721,911 A | 2/1998 | Ha et al. ................................ 1/1 |
| 5,734,887 A | 3/1998 | Kingberg et al. ..................... 1/1 |
| 5,857,191 A | 1/1999 | Blackwell, Jr. et al. |
| 5,889,942 A | 3/1999 | Orenshteyn |
| 5,892,909 A | 4/1999 | Grasso et al. |
| 5,950,010 A | 9/1999 | Hesse et al. |
| 5,999,948 A | 12/1999 | Nelson et al. |
| 6,014,666 A | 1/2000 | Helland et al. |
| 6,018,779 A * | 1/2000 | Blumenau ....................... 710/68 |
| 6,052,720 A | 4/2000 | Traversat et al. |
| 6,067,582 A | 5/2000 | Smith et al. |
| 6,105,066 A | 8/2000 | Hayes, Jr. |
| 6,163,878 A | 12/2000 | Kohl |

(Continued)

OTHER PUBLICATIONS

Little et al., Understanding the Role of Atomic Transactions and Group Communications in Implementing Persistent Replicated Objects, 8th International Workshop on Persistent Object Systems: Design Implementation and Use. 1999. Retrieved on Sep. 15, 2012 from http://reference.kfupm.edu.sa/content/u/n/understanding_the_role_of_atomic_transac_156229.pdf.*

(Continued)

*Primary Examiner* — Apu Mofiz
*Assistant Examiner* — Bryan Walker
(74) *Attorney, Agent, or Firm* — Zilka-Kotab, PC

(57) ABSTRACT

In accordance with embodiments, there are provided mechanisms and methods for applying a group of instructions to metadata in the context of an on-demand database service. These mechanisms and methods for applying a group of instructions to metadata can enable embodiments that ensure that "all or none" of the operations corresponding to the grouped instructions are performed. The ability of embodiments to provide such feature can prevent a scenario where only a portion of a desired effect is accomplished which, in turn, may complicate any effort to undo the same.

25 Claims, 9 Drawing Sheets

(56) References Cited

U.S. PATENT DOCUMENTS

| | | | |
|---|---|---|---|
| 6,205,476 | B1 | 3/2001 | Hayes, Jr. |
| 6,233,618 | B1 | 5/2001 | Shannon |
| 6,438,562 | B1 | 8/2002 | Gupta et al. |
| 6,523,027 | B1 | 2/2003 | Underwood |
| 6,574,655 | B1 | 6/2003 | Libert et al. |
| 6,633,835 | B1 * | 10/2003 | Moran et al. ............... 702/190 |
| 6,714,979 | B1 | 3/2004 | Brandt et al. |
| 6,732,100 | B1 | 5/2004 | Brodersen et al. .............. 1/1 |
| 6,732,109 | B2 | 5/2004 | Lindberg et al. ............... 1/1 |
| 6,981,207 | B1 | 12/2005 | Bakman et al. |
| 7,315,826 | B1 | 1/2008 | Guheen et al. |
| 7,657,887 | B2 | 2/2010 | Kothandaraman et al. |
| 7,698,160 | B2 | 4/2010 | Beaven et al. |
| 8,019,720 | B2 | 9/2011 | Jasik et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 2002/0035514 | A1 | 3/2002 | Whitley et al. ............... 705/26 |
| 2002/0133392 | A1 | 9/2002 | Angel et al. ............... 705/10 |
| 2003/0182328 | A1 | 9/2003 | Paquette et al. |
| 2003/0233404 | A1 | 12/2003 | Hopkins ............... 709/203 |
| 2004/0107125 | A1 | 6/2004 | Guheen et al. ............... 705/7 |
| 2004/0123048 | A1 | 6/2004 | Mullins et al. ............... 711/141 |
| 2004/0139075 | A1 | 7/2004 | Brodersen et al. ............... 707/6 |
| 2004/0210909 | A1 | 10/2004 | Dominguez, Jr. et al. .... 719/316 |
| 2005/0015591 | A1 | 1/2005 | Thrash et al. ............... 713/166 |
| 2005/0065925 | A1 | 3/2005 | Weissman et al. ............... 707/4 |
| 2005/0108186 | A1 * | 5/2005 | Anderson ............ 707/999.001 |
| 2005/0223022 | A1 | 10/2005 | Weissman et al. ............ 707/102 |
| 2005/0283478 | A1 | 12/2005 | Choi et al. ............... 707/9 |
| 2006/0047713 | A1 * | 3/2006 | Gornshtein et al. ... 707/999.202 |
| 2006/0136924 | A1 * | 6/2006 | Sadiq et al. ............... 718/104 |
| 2006/0206834 | A1 | 9/2006 | Fisher et al. ............... 715/777 |
| 2006/0248207 | A1 | 11/2006 | Olson et al. |
| 2007/0088741 | A1 * | 4/2007 | Brooks et al. .......... 707/999.103 |
| 2007/0113186 | A1 * | 5/2007 | Coles et al. ............... 715/735 |
| 2007/0208639 | A1 | 9/2007 | Lloyd et al. ............... 705/35 |
| 2007/0220004 | A1 | 9/2007 | Fifield et al. |
| 2008/0005111 | A1 * | 1/2008 | Savage ............... 707/999.008 |
| 2012/0290534 | A1 | 11/2012 | Jasik et al. |

OTHER PUBLICATIONS

Non-Final Office Action from U.S. Appl. No. 11/832,533, dated Feb. 14, 2011.

Final Office Action from U.S. Appl. No. 11/832,533, dated Aug. 24, 2010.

Notice of Allowance from U.S. Appl. No. 11/832,533, dated Jul. 13, 2011.

U.S. Appl. No. 11/832,533, filed Aug. 1, 2007.

Advisory Action Summary from U.S. Appl. No. 11/832,533 mailed on Nov. 9, 2010.

Wang et al: "A Study and Performance Evaluation of the Multi-Tenant Data Tier Design Patterns for Service Oriented Computing", IEEE International Conference on E-Business Engineering, NJ, USA, Oct. 22, 2008, pp. 94-101.

Mietzer et al: "Combining Different Multi-tenancy Patterns in Service Oriented Applications", IEEE International Enterprise Distributed Object Computing Conference, NJ, USA, Sep. 1, 2009 pp. 131-140.

Office Action Summary from U.S. Appl. No. 11/832,533 mailed on Mar. 18, 2010.

Non-Final Office Action from U.S. Appl. No. 13/554,884, dated Nov. 15, 2012.

Final Office Action from U.S. Appl. No. 13/554,884, dated May 22, 2013.

* cited by examiner

METHOD AND SYSTEM FOR APPLYING A GROUP OF INSTRUCTIONS TO METADATA

CLAIM OF PRIORITY

This application claims the benefit of U.S. Provisional Patent Application 60/827,875 entitled "Method And System For Updating A Subscriber Environment Of An On-Demand Database Service," by Jasik et al., filed Oct. 2, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to applying instructions to metadata in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

During use, a user often desires to modify metadata to tailor use of such database systems for a particular application. Non-limiting examples of such metadata may include, but are not limited to an object, field, etc. In some situations, the user may desire to modify more than one metadata instance to provide some desirable effect. In such situations, an issue may arise when one or more of the requested modifications is impermissible (and thus not performed), while other permissible modifications are carried out. This can result in only a portion of the desired effect being accomplished, and further complicate any effort to undo the modification(s) performed. There is thus a need for addressing these and/or other issues.

BRIEF SUMMARY

In accordance with embodiments, there are provided mechanisms and methods for applying a group of instructions to metadata in the context of an on-demand database service. These mechanisms and methods for applying a group of instructions to metadata can enable embodiments that ensure that "all or none" of the operations corresponding to the grouped instructions are performed. The ability of embodiments to provide such feature can prevent a scenario where only a portion of a desired effect is accomplished which, in turn, may complicate any effort to undo the same.

In an embodiment and by way of example, a method for applying a group of instructions to metadata in the context of an on-demand database service is provided. The method embodiment includes receiving a group of instructions indicating at least one operation to be performed on a plurality of instances of metadata associated with an environment of a subscriber of an on-demand database service. In use, the at least one operation is conditionally performed on the instances of metadata associated with the environment of the subscriber, based on whether at least one of the instructions is permissible.

While the present invention is described with reference to an embodiment in which techniques for applying a group of instructions to metadata are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for asynchronously performing an operation on metadata. In the context of the present description, the term "asynchronous performance" when used to describe an operation conducted on metadata associated with an on-demand database service refers to performing any operation, at least in part, independently of any other operation performed in the on-demand database service. Such independent performance may be any one or more of temporally independent, independent by control, independent in location or the like.

During use, a subscriber often desires to modify metadata (e.g. an object, field, etc.) to tailor use of an on-demand database service for a particular application. While such metadata may be modified using a web-based interface or the like by creating, adding to, deleting, changing, etc. the same, there is also a desire to be able to modify such metadata in a more automated manner (e.g. using a schema tool, etc.). In any case, it is desirable that the on-demand database service be available for other operations while such modifications are being implemented. For example, in the presence of any attempt to modify metadata and, more particularly a large number of metadata instances, the on-demand database service may be more apt to "hang" due to a lack of necessary resources and may further exhibit an inability to perform any additional services requested by the subscriber.

The following exemplary embodiments illustrate methods and mechanism that enable asynchronously performance of an operation on metadata to address the foregoing need.

Figure 1:
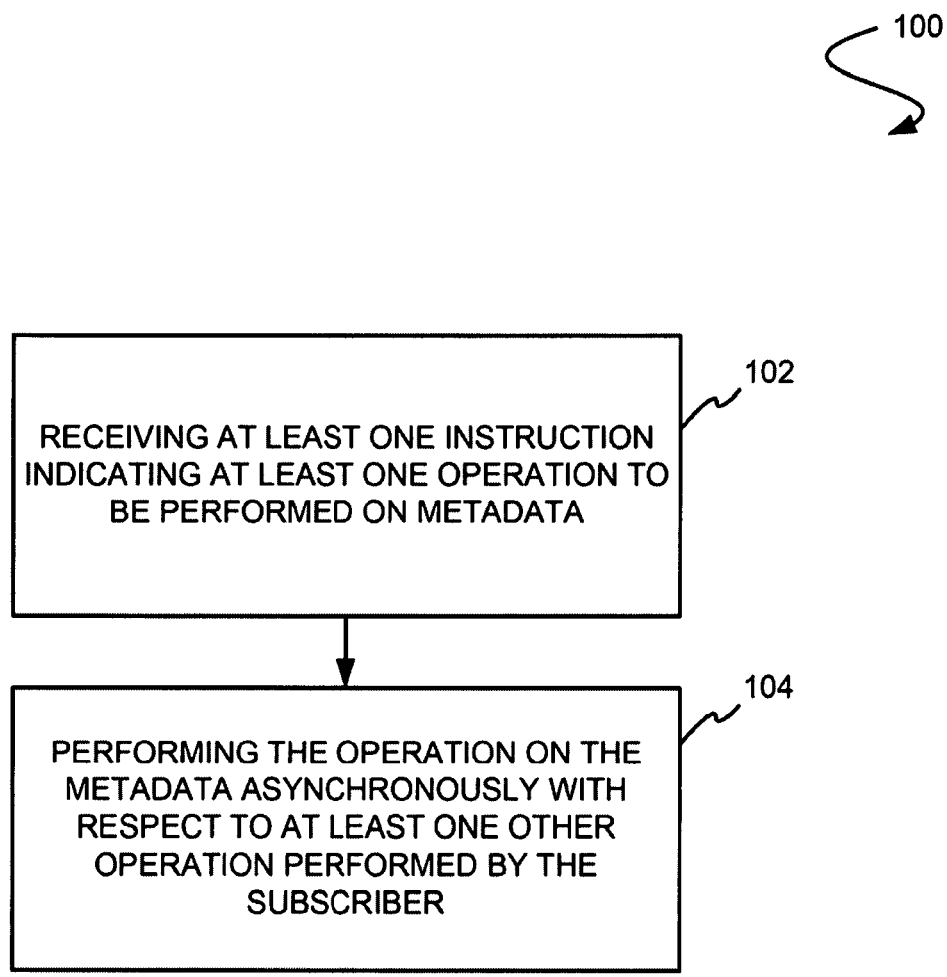
FIG. 1 illustrates a method for asynchronously performing an operation on metadata in the context of an on-demand database service, in accordance with one embodiment.

FIG. 1 illustrates a method 100 for asynchronously performing an operation on metadata in the context of an on-demand database service, in accordance with one embodiment. In the context of the present description, such on-demand database service may include any service that relies on a database that is accessible over a network. Various examples of such an on-demand database service will be set forth in the context of different embodiments that will be described during reference to subsequent figures.

In one embodiment, the aforementioned on-demand database service may include a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

As shown in operation 102, at least one instruction is received indicating at least one operation to be performed on metadata associated with an environment of a subscriber (i.e. any person or entity, etc.) of an on-demand database service. In the context of the present description, the foregoing instruction may include any data, code, etc. that is capable of being received and/or processed for the purpose of prompting the operation to be performed on the metadata. In various embodiments, the operation may include a modification (e.g. creating, adding, deleting, changing, etc.), processing, and/or any other operation that involves the metadata, at least in part. Still yet, the metadata may include a configuration, object, field, default value, name, data type, required indicator, default value schema, and/or any other data that is capable of being used to describe other data. Some non-limiting examples of operations that may be performed on metadata include adding new contacts, changing account information, etc.

In one embodiment, the instruction may be received from a user using a web-based interface. For example, such interface may allow a user to manually initiate the operation on the metadata by selecting each operation (e.g. modification, etc.) and metadata to be subjected to the operation, using an input device. In other embodiments, the instruction may be received in a more automated manner. For example, the instruction may be received from an application in response to a rule being triggered, as a result of a process configured by a user, etc. A non-limiting example of a tool that may be used for such purpose includes a schema tool, a third-party programmable application, etc. In another embodiment, the instruction may be received utilizing an application program interface (API) that is capable of receiving instructions from a variety of sources.

Next, in operation 104, the operation is performed on the metadata associated with the environment of the subscriber asynchronously with respect to at least one other operation performed by the subscriber using the on-demand database service. In the context of the present description, the aforementioned environment of the subscriber may include any aspect of the on-demand database service that is associated with the subscriber. For example, such environment may be different depending on a particular type of on-demand database service application to which the subscriber subscribes. Various examples of applications of an on-demand database service will be set forth in the context of different embodiments that will be described during reference to subsequent figures.

In the context of the present description, the term "asynchronous performance" when used to describe an operation conducted on metadata associated with an on-demand database service refers to performing any operation, at least in part, independently of any other operation performed in the on-demand database service. Such independent performance may be any one or more of temporally independent, independent by control, independent in location or the like. Of course, in various embodiments, such other operation may include any operation that is either similar to or different from that associated with the instruction(s) received in operation 102. By this design, the subscriber may independently perform the other operation without being necessarily affected by the performance of the operations associated with the instruction(s) received in operation 102.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
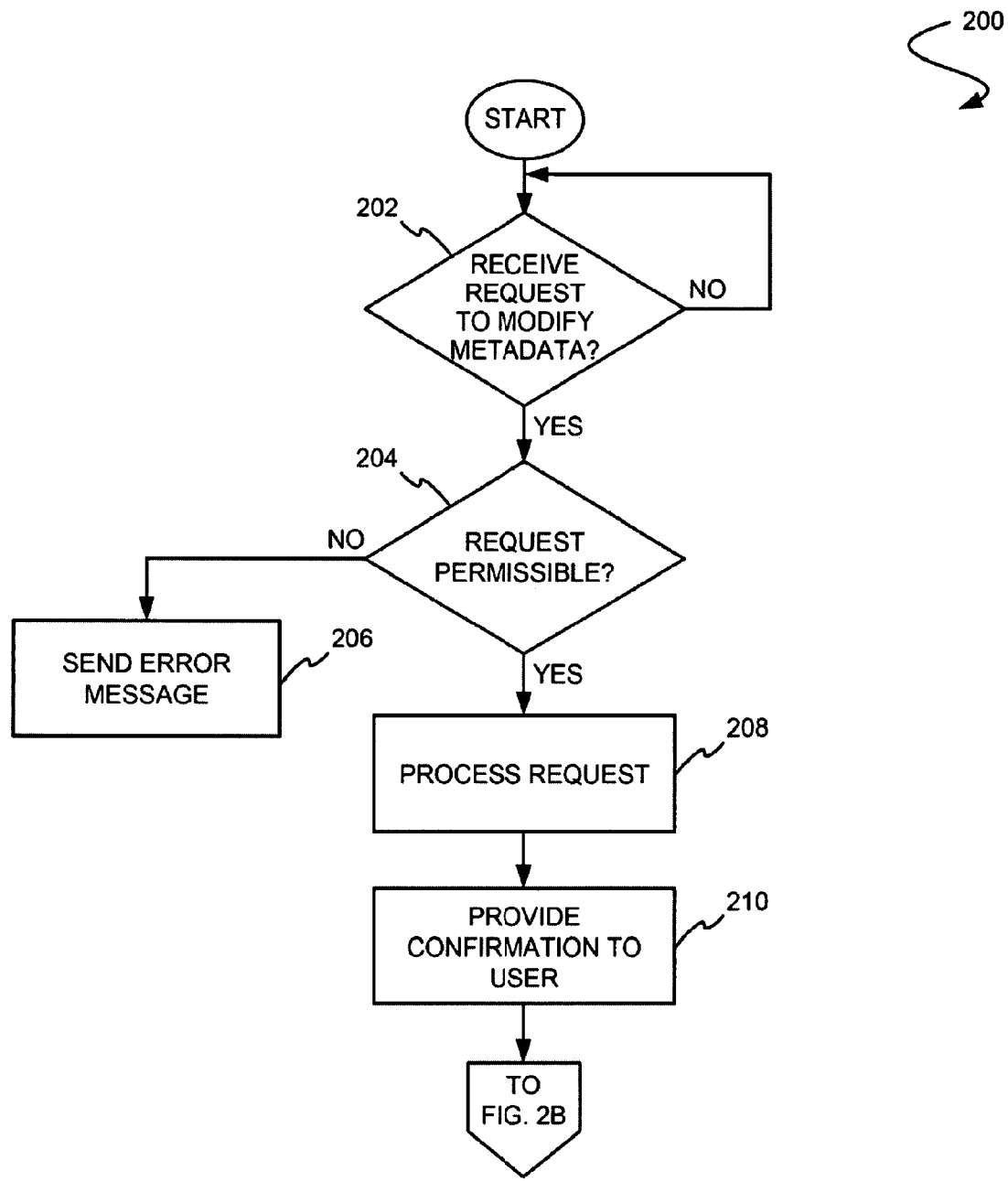
FIGS. 2A and 2B show a method for handling the receipt of a request to modify metadata, in accordance with another embodiment.
Figure 2B:
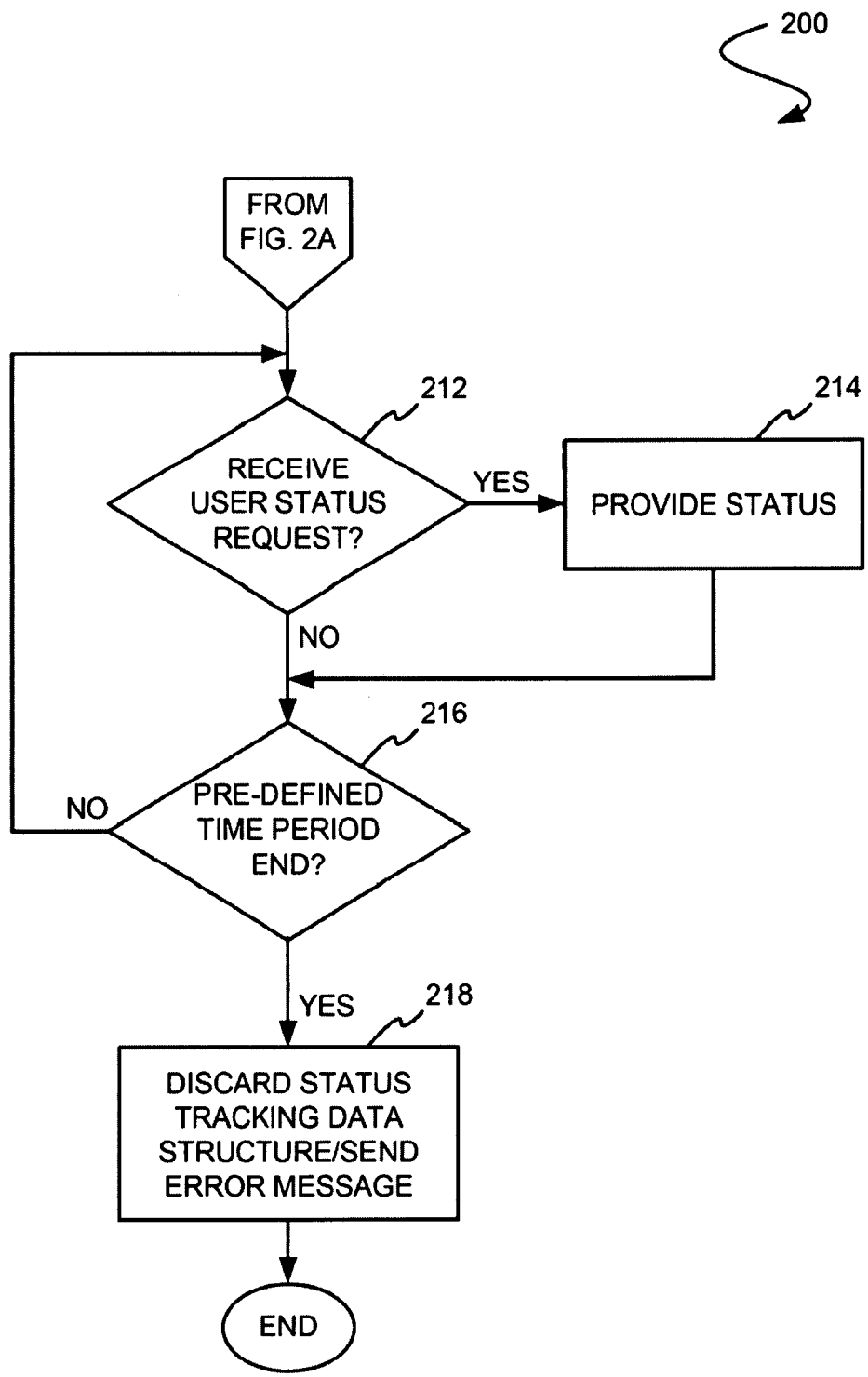

FIGS. 2A and 2B show a method 200 for handling the receipt of a request to modify metadata, in accordance with another embodiment. As an option, the present method 200 may be implemented in the context of the functionality of FIG. 1. Of course, however, the method 200 may be carried out in any desired environment. The aforementioned definitions may apply during the present description.

As shown, it is first determined whether a request has been received to modify (e.g. create, add, delete, change, etc.) metadata. See decision 202. In various embodiments, such request may be manually or automatically generated. Further, in one embodiment, such request may be directed to an on-demand database service, and include one or more instructions for performing one or more operations on the metadata.

Upon receipt of such a request, it is determined whether the request is permissible. Note decision 204. For example, it may be determined whether the instruction(s)/operation(s) is permissible. In one embodiment, such decision may be based on a status and associated access rights of the subscriber that made the request, rules surrounding the modification of the metadata (e.g. size limits, etc.), rules surrounding the request itself (e.g. formatting, protocol issues, etc.), etc. If it is determined that the request is impermissible, an error message is sent to the subscriber (see operation 206) and the underlying instruction(s)/operation(s) are disallowed. To this end, the operation associated with the request is conditionally performed on the metadata, based on the determination of operation 204.

On the other hand, if it is determined that the request is permissible per decision 204, the method 200 continues by initiating the processing of the request. See operation 208. Such processing results in the performance of any necessary operation on the metadata. One example of an execution of operation 208 will be set forth in the context of a different embodiment that will be described during reference to FIG. 3.

In further response to the receipt of the request and associated instruction(s), etc., a confirmation message is provided to the subscriber that the related processing has been initiated. Note operation 210. With the processing pending, a user may, at any time request a status of the processing. Such request, for example, may be sent to the on-demand database service via a web-based interface by selecting a status icon or the like.

Once it is determined that the on-demand database service has received such status request (see decision 212), the status is provided in the form of a status message. See operation 214. In various embodiments, the status may range from a simple completed/not complete indication, to a more detailed status that includes information on how/when a request was completed or why a request has not yet been completed. Non-limiting examples of such status may include "request received," "request pending," "request completed," etc.

In one optional embodiment, requests may be tracked for a limited amount of time, and thereafter discarded. This may be helpful in limiting an amount of resources (e.g. storage, etc.) required to administer the foregoing status checking functionality. In such embodiment, it may be determined, after the request processing has been initiated, whether a predetermined amount of time (e.g. 24 hours, etc.) has elapsed. Note decision 216. If so, any status tracking data structure may be discarded, as indicated in operation 218. To this end, the status message is conditionally sent to the subscriber, based on a time period within which the status request is received.

Figure 3:
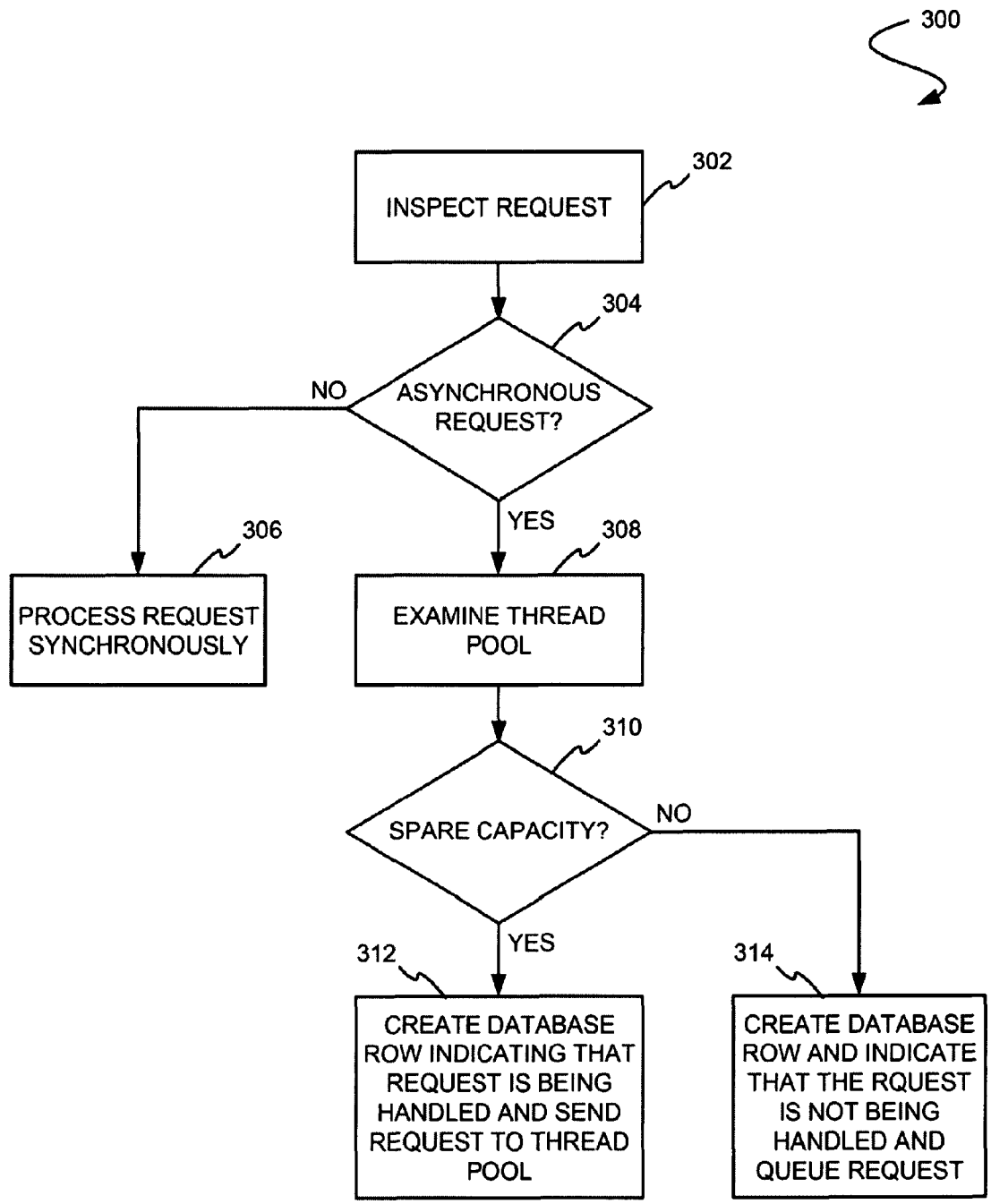
FIG. 3 shows a method for processing requests for modifying metadata, in accordance with another embodiment.

FIG. 3 shows a method 300 for processing requests for modifying metadata, in accordance with another embodiment. As an option, the present method 300 may be implemented in the context of the functionality of FIGS. 1-2. For example, the method 300 may be used to process a large number of requests at least a portion of which were received via the method 200 of FIGS. 2A-2B. Of course, however, the method 300 may be carried out in any desired environment. Yet again, the aforementioned definitions may apply during the present description.

In one embodiment, any requests received (e.g. via the method 200 of FIGS. 2A/2B, etc.) may be queued (not shown). Further, each request may be pulled from such queue for processing in accordance with the method 300 of FIG. 3. As shown, each request may be inspected, as set forth in operation 302. Such inspection may involve a header of the request or any other portion that indicates whether the request is an asynchronous request (which may be accompanied by an instruction, etc.).

In the present embodiment, the asynchronous request may be one that prompts an operation on metadata which does not necessarily have to be completed in real-time. For example, such an asynchronous request may be one that is received via a schema tool or the like (as opposed to a human subscriber, etc.). Thus, unlike a human subscriber request, such a request may be delayed via asynchronous processing without necessarily negatively impacting a subscriber experience.

If it is determined that the request is not an asynchronous request per decision 304, the request may be handled by a synchronous process. See operation 306. In one embodiment, such synchronous process may be allocated with sufficient resources to allow for real-time, near-real time, etc. processing of the request.

On the other hand, if it is determined that the request is an asynchronous request per decision 304, the request may be handled by an asynchronous process. Such asynchronous process may include a thread pool that is allocated a finite amount of a local resources (e.g. one or more application server, etc.). In such embodiment, such thread pool may be inspected before assigning a request to the same. See operation 308.

In conjunction with such inspection, it is determined whether the local thread pool has any spare capacity or at least enough capacity to process the request in real-time. See decision 310. If so, a request-tracking data structure is updated (e.g. a row is created) to reflect that the present request is being handled by the local thread pool. Note operation 312.

In use, such data structure may be used for status checking (e.g. see operations 212-214 of FIGS. 2A/2B, etc.), managing request processing, etc. In various embodiments, the tracking data structure may include a variety of fields such as a request identifier (assigned by the service), requested operation/metadata identifier, status information, an indication as to whether the corresponding request has been allocated to a resource (e.g. a thread, etc.), etc.

However, if it is determined that the local thread pool does not have any spare capacity or not enough capacity to process the request per decision 310, the request processing-tracking data structure is updated to reflect that the present request is not being handled by the local thread pool. Note operation 314. To this end, such requests may be queued and other resources (e.g. back-up resources such as a batch server, etc.) may be notified of the fact that the present request requires processing. In any case, whether the request is processed by the local thread pool or using other resources, the metadata may be modified and values associated with the metadata may be updated in response to such metadata modification.

As the request processing is completed, the aforementioned data structure may be updated to reflect such status. Further, any database rows that reflect the completed status may be deleted after a predetermined amount of time (e.g. 24 hours). See, for example, operations 216-218 of FIGS. 2A/2B.

Figure 4:
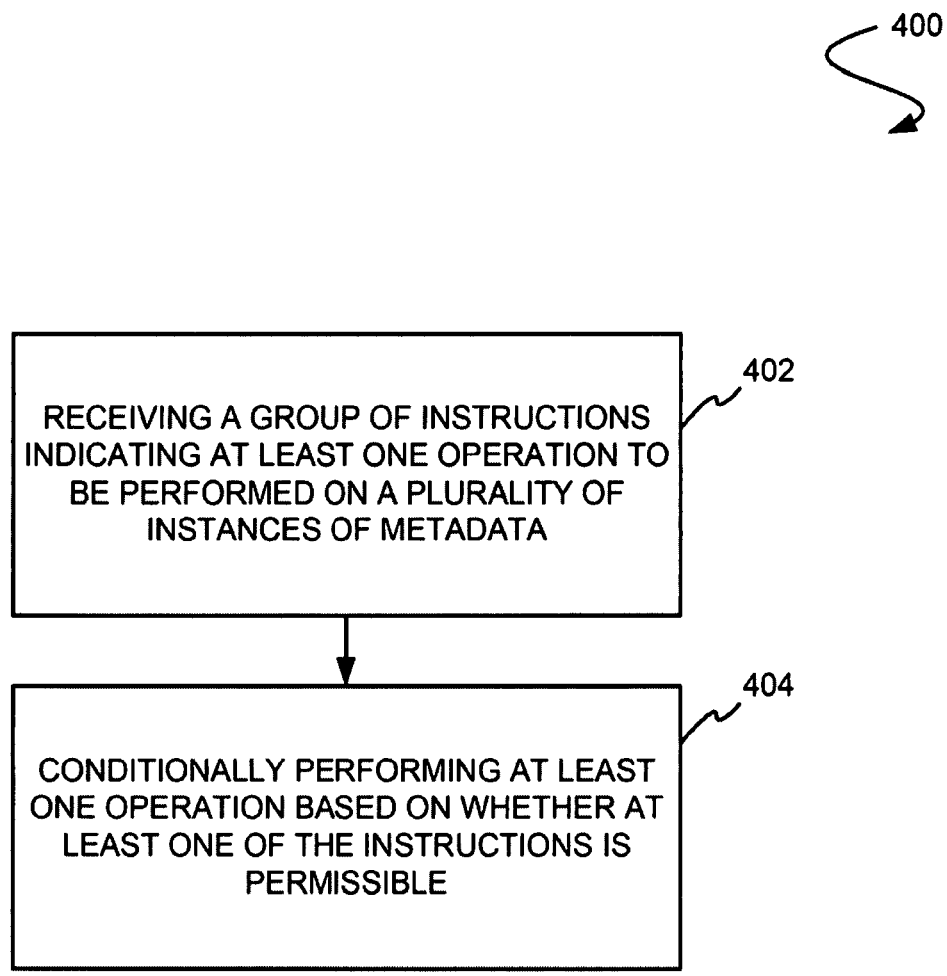
FIG. 4 shows a method for performing a group of operations on metadata in the context of an on-demand database service, in accordance with one embodiment.

FIG. 4 shows a method 400 for applying a group of instructions to metadata in the context of an on-demand database service, in accordance with one embodiment. As an option, the present method 400 may be implemented in the context of the functionality of FIGS. 1-3. For example, the method 400 may or may not incorporate the various features of the previous embodiments where, instead of just one instruction being received at a time, a group of instructions may be received. Of course, however, the method 400 may be carried out in any desired environment. The aforementioned definitions may apply during the present description.

As shown, a group of instructions may be received indicating at least one operation to be performed on a plurality of instances of metadata associated with an environment of a subscriber of an on-demand database service. See operation 402. With respect to each of the terms set forth in operation 402, corresponding definitions may be found, where applicable, during the description of FIG. 1 above.

Further, it should be noted that the group may be defined in any desired manner. For example, in one embodiment, a subscriber may manually enter the instructions (e.g. by requiring one or more modifications to metadata, etc.). Thus, the group may, in such embodiment, be subscriber-defined.

In other embodiments, the group may be defined as a function of the metadata and/or the operations to be performed. For example, a first operation to certain metadata may require a second operation on such metadata (e.g. due to dependencies, etc.). In such case, the corresponding instructions may be considered grouped.

Thereafter, the operation is conditionally performed on the instances of metadata associated with the environment of the subscriber, based on whether at least one of the instructions is permissible. See operation 404. Again, with respect to each of the terms set forth in operation 404, corresponding definitions may be found, where applicable, during the description of FIG. 1 above.

Further, the instructions may be deemed permissible based on any desired criteria. For example, a plurality of rules may dictate such permissibility. In various embodiments, such rules may involve the modification of the metadata (e.g. size limits, etc.), the request itself (e.g. formatting, protocol issues, etc.), and/or any other aspect.

Thus, in one embodiment, the operation may not necessarily be performed on the instances of metadata, if at least one of the instructions is impermissible. In other words, all of the instructions of the group may be required to be permissible, in order for the operation(s) to be applied. The ability of embodiments to provide such feature can thus prevent a scenario where only a portion of a desired effect is accomplished which, in turn, complicates any effort to undo the partial modification, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5A:
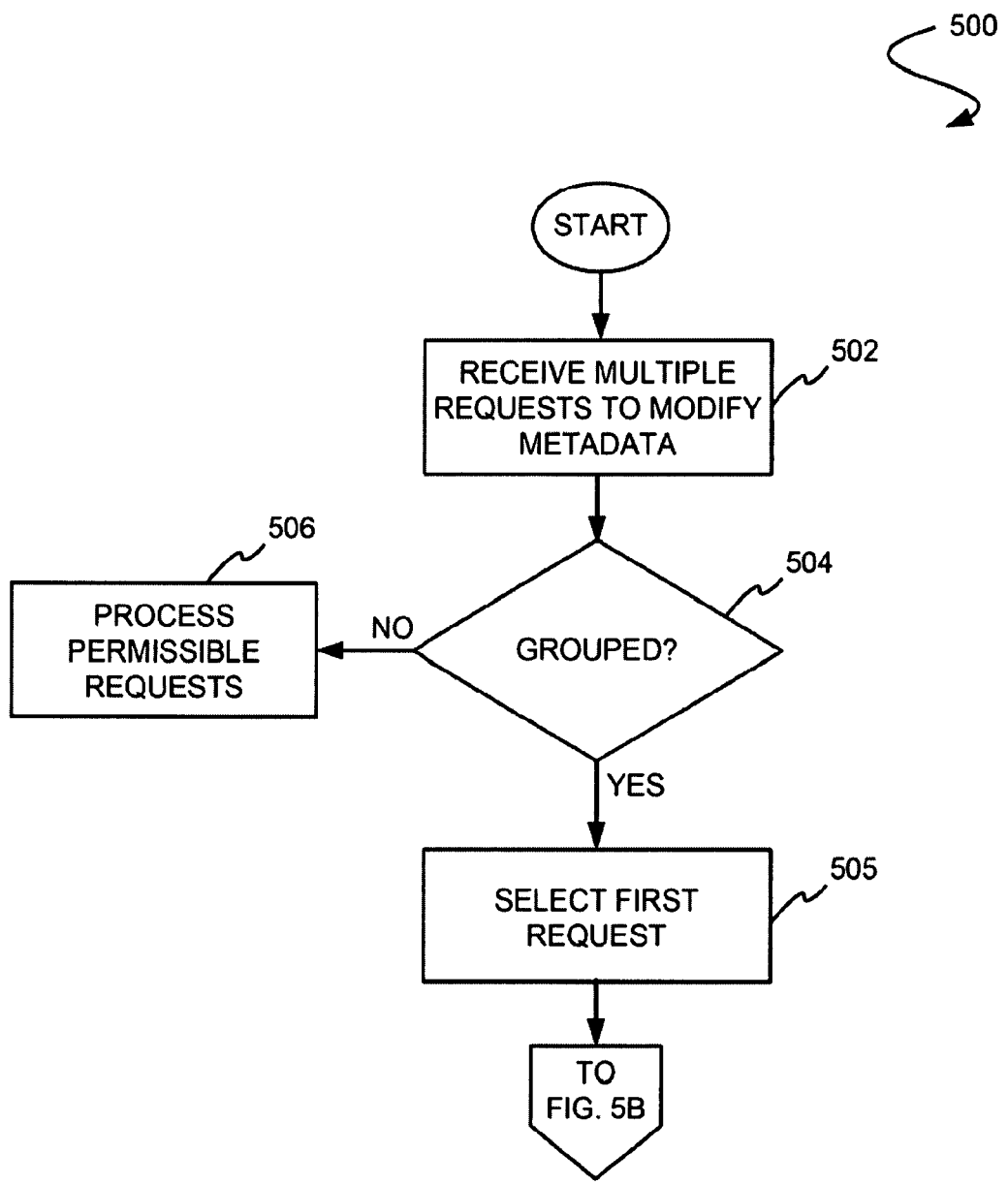
FIGS. 5A-5B show a method for performing a group of operations on metadata in the context of an on-demand database service, in accordance with another embodiment.
Figure 5B:
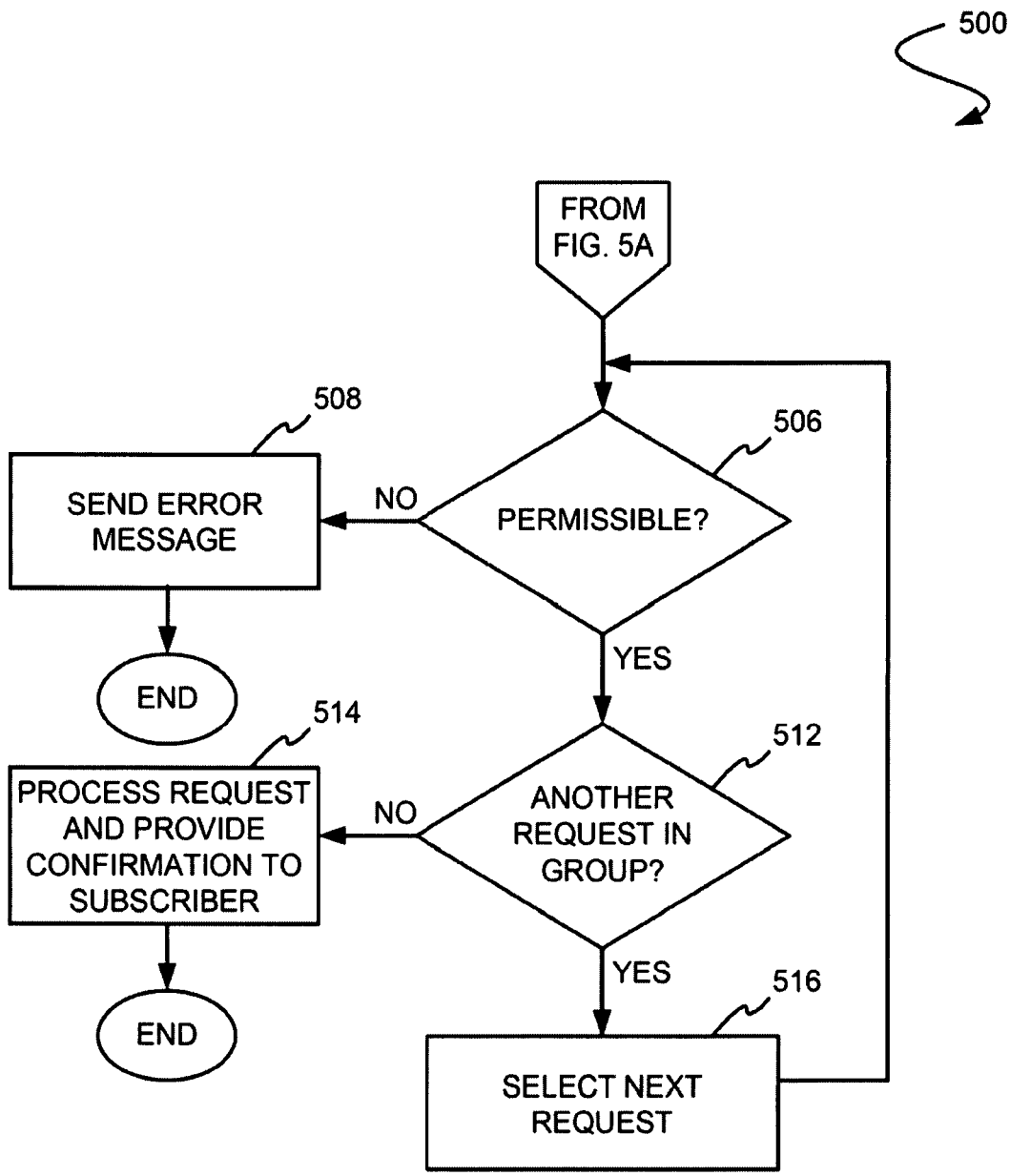

FIGS. 5A-5B show a method 500 for applying a group of instructions to metadata in the context of an on-demand database service, in accordance with another embodiment. As an option, the present method 500 may be implemented in the context of the functionality of FIGS. 1-4. Of course, however, the method 500 may be carried out in any desired environment. The aforementioned definitions may apply during the present description.

As shown, multiple requests are received. See operation 502. It is then determined whether the requests are members of a group. See decision 504.

To accomplish this, each request of a group may be flagged as such. This may be done by asserting a bit in association with the request, tagging the request, sending the request via a protocol that indicates the group status, if any, etc. In one embodiment, any such data structure or protocol may include a group identifier that uniquely identifies an associated group.

In other embodiments, any of the foregoing may be accomplished via a mechanism (e.g. data structure, etc.) that is separate from the request itself, and possibly be stored at a central location, etc.

In any case, if it is determined that the requests are not part of a group, such requests may simply be processed. See operation 506. In one embodiment, such processing may involve an operation on metadata in accordance with an instruction accompanying the request. In another embodiment, such processing may include any of the techniques set forth earlier during reference to FIGS. 1-3. In such situations where the requests are not part of a group, each request that is permissible may be processed irrespective of any other of the multiple requests being deemed impermissible.

If it is determined that the requests are indeed part of a group, a first request is selected. See operation 505. Further, it is first determined whether such request is permissible, as indicated in decision 506. Again, such permissibility may be based on any desired criteria, such as that set forth above in describing FIGS. 2A/2B, 4, etc.

If the present request is deemed impermissible, an error message is sent to the subscriber. Further, the method 500 terminates and none of the requests of the group are processed.

If, however, the present request is deemed permissible, it is determined whether another request is included in the group. See decision 512. If so, a next request is selected in operation 516. Further, operations 506-512 are repeated accordingly. Upon it being determined that no other request is included in the group in decision 512 (and thus, each of the requests of the group are permissible), all of the requests of the group are processed and a confirmation message is sent to the subscriber. Note operation 514.

System Overview

Figure 6:
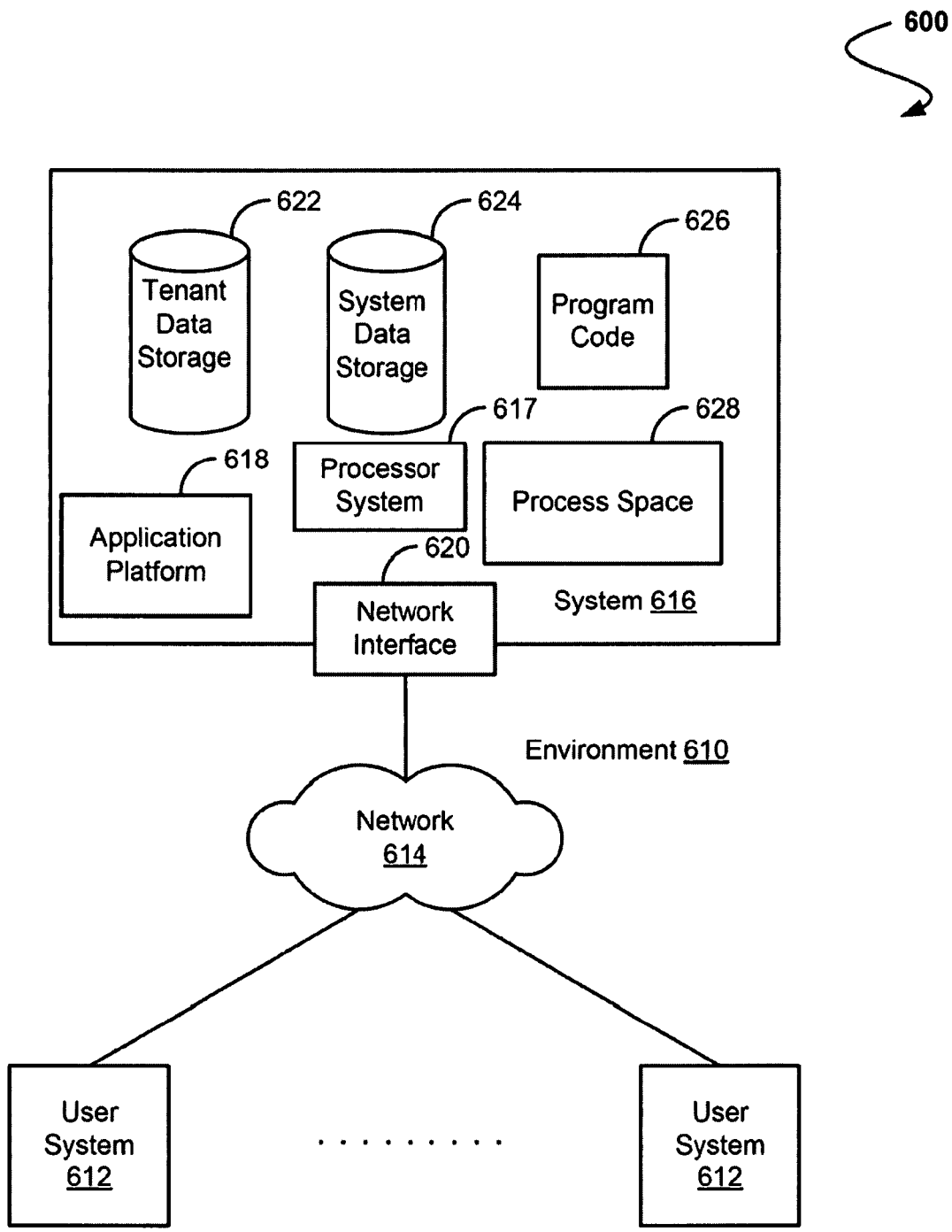
FIG. 6 illustrates a block diagram of an example of an environment wherein an on-demand database service might be used.

FIG. 6 illustrates a block diagram of an environment 610 wherein an on-demand database service might be used. As an option, any of the previously described embodiments of the foregoing figures may or may not be implemented in the context of the environment 610. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS)

or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system; For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

Figure 7:
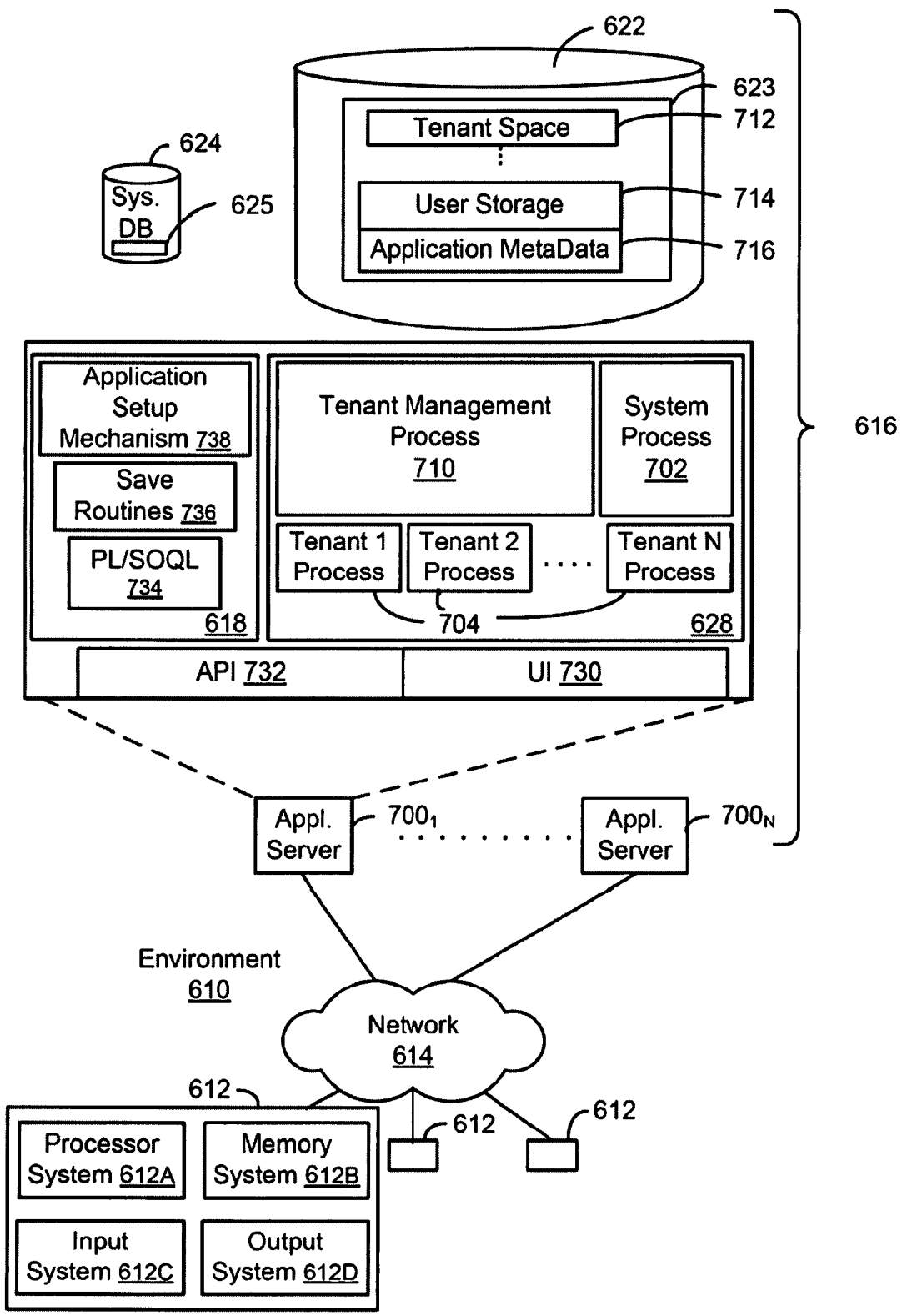
FIG. 7 illustrates a block diagram of an embodiment of elements of FIG. 6 and various possible interconnections between these elements.

One arrangement for elements of system 616 is shown in FIG. 7, including a network interface 620, application platform 618, tenant data storage 622 for tenant data 623, system data storage 624 for system data accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700, might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   receiving a plurality of instructions indicating at least one operation to be performed on a plurality of instances of metadata associated with an environment of a subscriber of an on-demand database service, wherein each of the instructions is separately received with a corresponding request to perform the corresponding instruction, such that a plurality of requests are received each indicating a separate one of the instructions to be performed;
   determining that the plurality of instructions are members of a same group utilizing information corresponding to the instructions indicating that the instructions are each a member of the group, wherein the information corresponding to the instructions indicating that the instructions are each a member of the group is included in each of the separate requests and includes one of a bit asserted in association with each of the plurality of requests and a tag included within each of the plurality of requests; and conditionally performing the at least one operation on the instances of metadata associated with the environment of the subscriber, based on whether each of the instructions in the group of instructions is permissible, wherein it is determined whether each of the instructions in the group of instructions is permissible based on at least one of a status and associated access rights of the subscriber, rules associated with the at least one operation to be performed on the instances of the metadata, and rules associated with the instructions;

wherein all of the instructions of the group are required to be permissible in order for the at least one operation to be performed, such that if at least one of the instructions of the group is impermissible then none of the at least one operation indicated by the group of instructions is performed;

wherein when it is determined that all of the instructions of the group are permissible, each of the corresponding requests are inspected to determine a header associated with each of the requests, where for each request, the header indicates whether the request is an asynchronous request;

wherein for each request, when it is determined that the header indicates that the request is an asynchronous request, it is determined whether a local thread pool has enough capacity to process the request in real-time.

2. The method of claim 1, wherein the group is defined by the subscriber.

3. The method of claim 1, wherein the at least one operation is performed on the instances of metadata associated with the environment of the subscriber asynchronously with respect to at least one other operation performed by the subscriber using the on-demand database service.

4. The method of claim 1, wherein the group of instructions is received utilizing an application program interface (API).

5. The method of claim 1, wherein the at least one operation includes at least one of creating, adding, deleting, updating, and status checking.

6. The method of claim 1, wherein the metadata includes at least one of a configuration, an object, a field, and a value associated with the environment.

7. The method of claim 1, and further comprising updating values associated with the metadata.

8. The method of claim 1, and further comprising sending a confirmation message to the subscriber, in response to the receipt of the group of instructions.

9. The method of claim 1, and further comprising receiving a status request from the subscriber.

10. The method of claim 9, and further comprising sending a status message to the subscriber, in response to the receipt of the status request.

11. The method of claim 10, wherein the status message is conditionally sent to the subscriber, based on a time period within which the status request is received.

12. The method of claim 1, and further comprising processing the group of instructions.

13. The method of claim 12, wherein the processing includes determining whether the group of instructions accompanies an asynchronous request.

14. The method of claim 13, and further comprising determining whether a processing capacity is available, if it is determined that the group of instructions accompanies an asynchronous request.

15. The method of claim 14, wherein the group of instructions is processed in real-time, if it is determined that the processing capacity is available.

16. The method of claim 14, and further comprising queuing the group of instructions for processing, if it is determined that the processing capacity is unavailable.

17. The method of claim 1, wherein the on-demand database service includes a multi-tenant database system.

18. The method of claim 1, wherein the group of instructions is defined as a function of the metadata and the at least one operation based on a dependency between the metadata and the at least one operation indicating that a first operation of the at least one operation on the metadata requires a second operation of the at least one operation on the metadata.

19. The method of claim 1, wherein the at least one operation indicated by the group of instructions is executable for obtaining a particular effect on the instances of the metadata, and all of the instructions of the group are required to be permissible in order for the at least one operation to be performed to avoid only a portion of the desired effect being accomplished when a portion of the at least one operation is prevented from being executed as a result of one or more of the instructions in the group being impermissible.

20. The method of claim 1, wherein it is determined whether each of the instructions in the group of instructions is permissible based on the status and associated access rights of the subscriber, the rules associated with the at least one operation to be performed on the instances of the metadata, and the rules associated with the instructions.

21. The method of claim 1, wherein for each request, if it is determined that the local thread pool has enough capacity to process the request in real-time, a row is created in a request-tracking data structure to reflect that the request is being handled by a local thread pool.

22. The method of claim 21, wherein the request-tracking data structure includes a plurality of fields, including a field indicating an identifier of the request, a field indicating an operation to be performed, a field indicating the metadata on which the operation is performed, a field indicating a status of the request, and a field indicating whether the request has been allocated to a thread.

23. A non-transitory machine-readable medium carrying one or more sequences of instructions which, when executed by one or more processors, cause the one or more processors to carry out the steps of:

receiving a plurality of instructions indicating at least one operation to be performed on a plurality of instances of metadata associated with an environment of a subscriber of an on-demand database service, wherein each of the instructions is separately received with a corresponding request to perform the corresponding instruction, such that a plurality of requests are received each indicating a separate one of the instructions to be performed;

determining that the plurality of instructions are members of a same group utilizing information corresponding to the instructions indicating that the instructions are each a member of the group, wherein the information corresponding to the instructions indicating that the instructions are each a member of the group is included in each of the separate requests and includes one of a bit asserted in association with each of the plurality of requests and a tag included within each of the plurality of requests; and conditionally performing the at least one operation on the instances of metadata associated with the environment of the subscriber, based on whether each of the instructions in the group of instructions is permissible, wherein it is determined whether each of the instructions in the group of instructions is permissible based on at least one of a status and associated access rights of the subscriber, rules associated with the at least one operation to be performed on the instances of the metadata, and rules associated with the instructions;

wherein all of the instructions of the group are required to be permissible in order for the at least one operation to be performed, such that if at least one of the instructions of the group is impermissible then none of the at least one operation indicated by the group of instructions is performed;

wherein when it is determined that all of the instructions of the group are permissible, each of the corresponding requests are inspected to determine a header associated with each of the requests, where for each request, the header indicates whether the request is an asynchronous request;

wherein for each request, when it is determined that the header indicates that the request is an asynchronous request, it is determined whether a local thread pool has enough capacity to process the request in real-time.

24. An apparatus, comprising:
a hardware processor; and
one or more stored sequences of instructions which, when executed by the processor, cause the processor to carry out the steps of:
receiving a plurality of instructions indicating at least one operation to be performed on a plurality of instances of metadata associated with an environment of a subscriber of an on-demand database service, wherein each of the instructions is separately received with a corresponding request to perform the corresponding instruction, such that a plurality of requests are received each indicating a separate one of the instructions to be performed;
determining that the plurality of instructions are members of a same group utilizing information corresponding to the instructions indicating that the instructions are each a member of the group, wherein the information corresponding to the instructions indicating that the instructions are each a member of the group is included in each of the separate requests and includes one of a bit asserted in association with each of the plurality of requests and a tag included within each of the plurality of requests; and
conditionally performing the at least one operation on the instances of metadata associated with the environment of the subscriber, based on whether each of the instructions in the group of instructions is permissible wherein it is determined whether each of the instructions in the group of instructions is permissible based on at least one of a status and associated access rights of the subscriber, rules associated with the at least one operation to be performed on the instances of the metadata, and rules associated with the instructions;
wherein all of the instructions of the group are required to be permissible in order for the at least one operation to be performed, such that if at least one of the instructions of the group is impermissible then none of the at least one operation indicated by the group of instructions is performed;

wherein when it is determined that all of the instructions of the group are permissible, each of the corresponding requests are inspected to determine a header associated with each of the requests, where for each request, the header indicates whether the request is an asynchronous request;

wherein for each request, when it is determined that the header indicates that the request is an asynchronous request, it is determined whether a local thread pool has enough capacity to process the request in real-time.

25. A method for transmitting code in a multi-tenant database system on a transmission medium, the method comprising:
transmitting code to receive a plurality of instructions indicating at least one operation to be performed on a plurality of instances of metadata associated with an environment of a subscriber of an on-demand database service, wherein each of the instructions is separately received with a corresponding request to perform the corresponding instruction, such that a plurality of requests are received each indicating a separate one of the instructions to be performed;
transmitting code to determine that the plurality of instructions are members of a same group utilizing information corresponding to the instructions indicating that the instructions are each a member of the group, wherein the information corresponding to the instructions indicating that the instructions are each a member of the group is included in each of the separate requests and includes one of a bit asserted in association with each of the plurality of requests and a tag included within each of the plurality of requests; and
transmitting code to conditionally perform the at least one operation on the instances of metadata associated with the environment of the subscriber, based on whether each of the instructions in the group of instructions is permissible, utilizing a processor wherein it is determined whether each of the instructions in the group of instructions is permissible based on at least one of a status and associated access rights of the subscriber, rules associated with the at least one operation to be performed on the instances of the metadata, and rules associated with the instructions;
wherein all of the instructions of the group are required to be permissible in order for the at least one operation to be performed, such that if at least one of the instructions of the group is impermissible then none of the at least one operation indicated by the group of instructions is performed;
wherein when it is determined that all of the instructions of the group are permissible, each of the corresponding requests are inspected to determine a header associated with each of the requests, where for each request, the header indicates whether the request is an asynchronous request;
wherein for each request, when it is determined that the header indicates that the request is an asynchronous request, it is determined whether a local thread pool has enough capacity to process the request in real-time.

* * * * *